United States Patent

Barnes

[11] 3,722,057
[45] Mar. 27, 1973

[54] BEARING SERVICE TOOL
[75] Inventor: Dwaine R. Barnes, East Peoria, Ill.
[73] Assignee: Caterpillar Tractor Co., Peoria, Ill.
[22] Filed: Sept. 29, 1971
[21] Appl. No.: 184,725

[52] U.S. Cl. ............... 29/200 D, 29/149.5 R, 29/401
[51] Int. Cl. ....... B23p 19/00, B21d 53/10, B23p 7/00
[58] Field of Search..... 29/200 D, 200 B, 200 R, 401, 29/149.5 R

[56] References Cited

UNITED STATES PATENTS 1,872,600    8/1932    Manning..........................29/149.5 R Primary Examiner—Thomas H. Eager
Attorney—Fryer, Tjensvold, Feix, Phillips & Lempio

[57] ABSTRACT

A bearing service tool for removing and installing a sleeve-type half bearing, upon which is mounted the journals of an internal-combustion-engine crankshaft, without removing the crankshaft. The tool has an elongated rod selectively insertable into an angularly-disposed oil passage in the crankshaft. Pivotally mounted upon the rod is a bearing-engaging member which is capable of contacting an adjacent end of the half bearing in intimate facing relationship therewith irrespective of the angular disposition of the particular oil passage in which the rod resides to move the half bearing relative to its associated retaining seat as the crankshaft is rotated.

7 Claims, 4 Drawing Figures

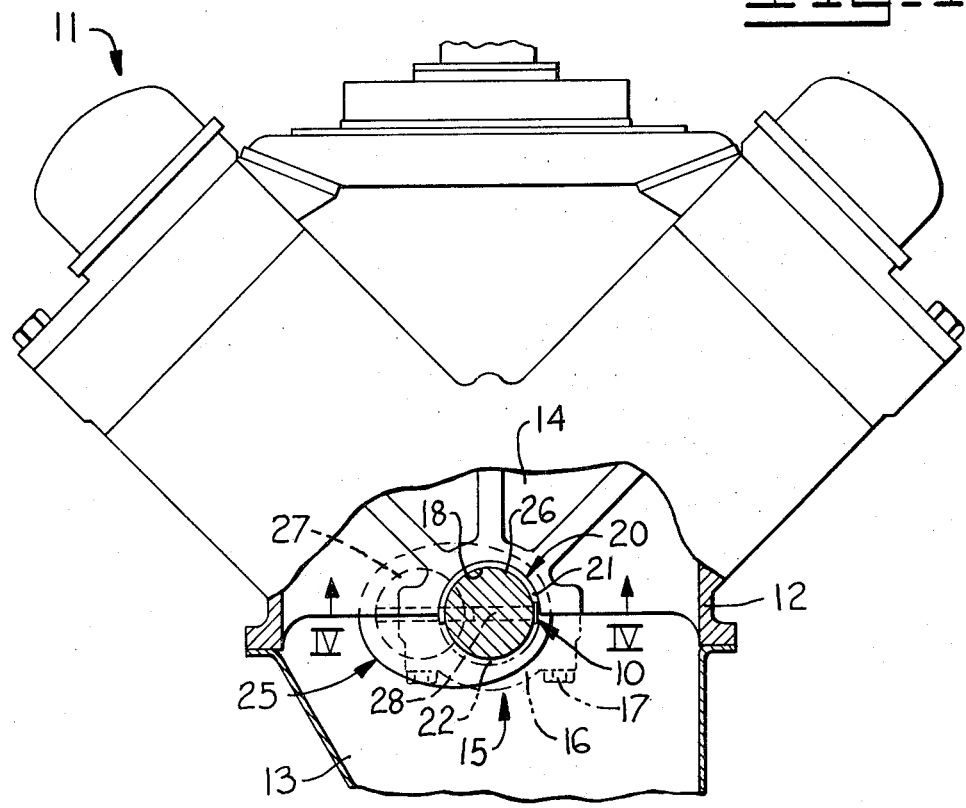
Fig.-1.
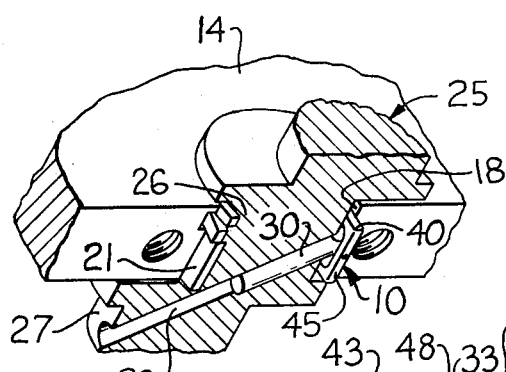
Fig.-4.
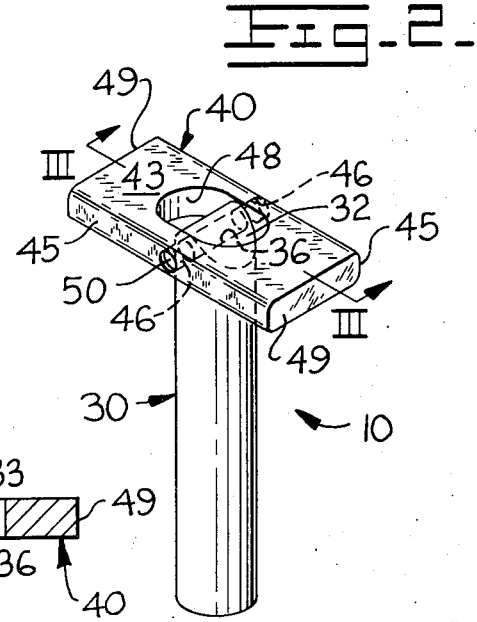
Fig.-2.
Fig.-3.
INVENTOR
DWAINE R. BARNES
BY
ATTORNEYS 3,722,057

BEARING SERVICE TOOL

BACKGROUND OF THE INVENTION

Service tools are available for removing the sleeve-type half bearings which mount the crankshafts of internal-combustion engines which half bearings are normally inaccessible without recourse to the removal of the crankshaft from the block. This is because the half bearings are disposed between their associated seats and the main journals of the crankshaft. An example of such prior art service tools, having a rod attached at one end to a bearing-engaging plate member at a fixed angle, is disclosed in U.S. Pat. No. 1,872,600 to Manning. However, the fixed-angle bearing service tools which are commercially available have the distinct disadvantage of being usable only with crankshafts having oil passages disposed between the adjacent throws thereof at an angle corresponding to that between the rod and plate member portions of the tool. Because of the large number of different oil passage angles employed in engine crankshafts, the acquisition of a similarly large number of such bearing service tools is required for servicing the different engines, with consequent high cost. Furthermore, much time is lost acquiring the proper tool to be used with a particular engine.

OBJECTS OF THIS INVENTION

It is an object of this invention to provide an improved bearing service tool for removing and installing a sleeve-type half bearing which is disposed in a normally inaccessible position between a bearing seat and a crankshaft without first removing the crankshaft.

Another object of this invention is to provide an economical, durable, and universally adaptable bearing service tool which, as a unit, can be utilized in lieu of the relatively large number of different prior art tools normally required.

Another object of this invention is to provide an improved bearing service tool which is adapted to utilize an angularly-disposed oil passage, in a bearing-supported crankshaft, for the insertion of an elongated driving member having a bearing-engaging plate member pivotally mounted thereupon which member engages one end of the bearing irrespective of the angular disposition of the passage in the crankshaft, and drives the bearing relative to its seat upon rotation of the crankshaft.

Other objects and advantages of the present invention will become more readily apparent upon reference to the accompanying drawing and following description.

BRIEF DESCRIPTION OF THE DRAWING

FIG. 1 is an end view of an internal-combustion engine with portions broken away and shown in section to illustrate a crankshaft supported by a journal box as well as the employment of the bearing service tool of the present invention;

FIG. 2 is a somewhat enlarged, isometric view illustrating the preferred embodiment of the bearing service tool of FIG. 1;

FIG. 3 is a transverse vertical section through the tool taken generally along the lines III—III of FIG. 2; and FIG. 4 is a partially-sectioned isometric view of a fragmentary portion of an engine crankshaft and journal box taken generally along lines IV—IV of FIG. 1 illustrating the bearing service tool positioned for removing an upper, sleeve-type half bearing.

DESCRIPTION OF THE PREFERRED EMBODIMENT

Referring to the drawing, a bearing service tool 10 embodying the principles of the present invention is adapted to be associated with an internal combustion engine, generally indicated by the reference numeral 11. The engine has a crankcase 12 and a removable oil pan 13 providing access to the interior of the crankcase. Located within the crankcase is a plurality of transverse webs, one of which is designated by the numeral 14. Each web supports a journal box, shown generally at 15, having a bearing cap 16 removably secured thereto by a pair of mounting bolts 17. A cylindrical bearing seat 18 is formed through the web and the cap which receives a cylindrical sleeve-type split bearing, shown generally at 20. The bearing includes an upper half 21 in the portion of the seat within the web and an opposite lower half 22 in the portion of the seat within the cap.

A crankshaft 25 is rotatably mounted within the crankcase 12 of the engine by extension through the journal boxes 15. The crankshaft has a plurality of main bearing surfaces of journals 26 individually journaled within the bearings 20. The crankshaft also has a plurality of offset rod journals 27 individually adjacent each of the main journals. A plurality of angled oil passages 28 extend through the crankshaft between each main journal and its adjacent rod journal in order to provide lubricating fluid for the bearings. The angular disposition of the oil passages is determined by many design factors and may vary for crankshafts of different engines and between the several bearing journals of a single crankshaft.

The preferred embodiment of the bearing service tool 10 of the present invention, as best shown in FIGS. 2 and 3, includes an elongated, cylindrical drive rod 30. The rod has an end 32 which is tapered by way of a pair of opposite, endwardly-converging planar surfaces 33 tangentially ending at an arcuate nose portion 34 having a predetermined radius. A small bore 36, formed through tapered end 32, is positioned between the surfaces 33 and transverse to the longitudinal axis of the drive rod. The curvilinear surface portion of the nose 34 is preferably concentric with that of the bore 36 for a purpose subsequently to be described.

Bearing service tool 10 further includes a bearing-engaging plate member 40 having opposite inner and outer surfaces 42 and 43, respectively, and opposite side surfaces 45. Side surfaces 45 are slightly rounded to prevent them from digging into bearing 20 or bearing seat 18. Each side surface 45 is also provided with a small bore 46 centrally positioned therein. A centrally-positioned, elongated opening or slot 48 transpierces the inner and outer surfaces 42 and 43, respectively, and intersects with bores 46. Plate member 40 has a thickness which is somewhat less than that of the bearing 20. This prevents the plate member from wedging between the main journal 26 and the seat 18. A pair of opposite ends 49 interconnecting inner and outer surfaces 42 and 43, respectively, and opposite side surfaces 45, is substantially parallel to the longitudinal axis of the bores 46.

A pin 50 is insertable through bore 36 and bores 46 for pivotally attaching the drive rod 30 to the bearing-engaging plate member 40. The diameters of bores 36, 46, and pin 50 are such that a press-fit is provided for the pin in one of the bores, as in bore 46, and a slip-fit is provided in the other of the bores, as in bore 36, whereby the pin is selectively retained in one and movable in the other.

Slot 48 of bearing-engaging plate member 40 is of a sufficient length to permit adjustable swinging movement of the plate member relative to drive rod 30 through an arc of approximately 90°. The bearing service tool 10 thus provides a range of angular adjustments in contradistinction to prior art tools which provide fixed angular settings adaptable for use in only particular oil passages having known angles of incline. This permits the universal use of this tool in any engine.

It will be noted that the tapered end 32 of drive rod 30, described earlier, acts to minimize contact between the rod and seat 18. This is so because the tapered end 32 maintains a substantially tangential relationship with the outer surface 43 of the plate member 40 throughout the entire arc of angular adjustment and does not protrude beyond the confines of said surface.

Because the pin 50 is disposed coaxially with the lines of driving force applied to the opposite side surfaces 45 of the plate member 40 when bearing 21 is driven from its seat, and because of the aforementioned slip fit in one of the bores, the driving forces are transmitted directly between rod 30 and plate member 40 without loading on the pin.

OPERATION

Although the operation of the present invention may be garnered from the foregoing description, the following brief summary will be given in the interest of clarity.

When it is desired to remove or replace a crankshaft main bearing, it is first necessary to remove the oil pan 13 or access doors (not shown) to expose the interior of the crankcase and crankshaft 25. Then, bolts 17 are loosened and bearing cap 16 is removed. This permits access for the removal of the lower half 22 of sleeve-type split bearing 20 contained therein. The crankshaft 25 is rotated, usually by hand, to expose the main journal opening of an angled oil passage 28. As best shown in FIG. 4, drive rod 30 of bearing service tool 10 is inserted into the passage. Bearing-engaging plate member 40 is angularly adjusted with respect to rod 30 so that it lies flatly along the longitudinal periphery of main journal 26. Then, crankshaft 25 is again rotated so that one of the opposite side surfaces 45 of the plate member 40 contacts one of the adjacent ends of the upper half 21 of sleeve-type split bearing 20 and drives it from its seat 18.

To place a new bearing in the seat, it is only necessary to reverse the above process. Thus, a new upper bearing half 21 is placed on the crankshaft's main journal 26 and the crankshaft is rotated so that the plate member 40 drives the bearing into proper position.

While the invention has been described and shown with particular reference to the preferred embodiment, it will be apparent that variations might be possible that would fall within the scope of the present invention which is not intended to be limited, except by the scope of the appended claims.

I claim:

1. In an engine having a crankshaft journaled in sleeve-type half bearings which bearings are seated within portions of said engine and wherein said crankshaft has at least one passageway for lubricating fluid bored therein, a bearing service tool for said half-bearings comprising; a rod member having axially-opposed first and second end portions, said second end portion adapted for insertion into said at least one passageway, a half bearing-engaging plate member pivotally mounted upon said first end portion of said rod member such that said plate member is capable of driving engagement with a half bearing while said second end portion is inserted in said at least one passageway.

2. A bearing service tool comprising; rod means, said rod means having first and second axially-opposed end portions, a bearing-engaging plate member movably mounted upon said first end portion and selectively adjustable to any of a plurality of angular dispositions relative to the axis of said rod means.

3. The invention of claim 2 wherein said plate member has an elongated slot means therein and wherein said first end portion is received within said slot means and pivotally connected between side portions of said slot means.

4. The invention of claim 2 wherein said bearing-engaging plate member has opposed parallel top and bottom surfaces and opposed parallel side surfaces, one of said side surfaces being adapted for driving engagement with a bearing, plate bore means extending completely through said plate member from said one of said side surfaces to the other of said side surfaces, other bore means in said first end portion of said rod means, and pin means extending through said plate bore means and said other bore means for pivotally mounting said plate member upon said rod means.

5. The invention of claim 3 wherein said slot means extends from a substantially flat upper surface of said plate member to a lower surface thereof and wherein said first end portion of said rod means does not extend axially beyond the confines of said substantially flat upper surface.

6. The invention of claim 1 wherein said plate member has a generally flat rectangular configuration with top and bottom surfaces and opposed side surfaces and wherein one of said side surfaces engages said half bearing, said one of said side surfaces having smoothly rounded edge portions to prevent damage to said portions of said engine during use of said bearing service tool.

7. The invention of claim 5 wherein the axial outermost portion of said first end portion of said rod means is tapered and rounded.

* * * * *